United States Patent
Koyama

[15] 3,698,503
[45] Oct. 17, 1972

[54] SUPPORT OF AN AIR HOSE OF AN AIR CLEANER OF A MOTORCYCLE AT ITS INLET OPENING

[72] Inventor: Mikihiro Koyama, Adachi-machi, Japan

[73] Assignee: Honda Giken Kogyo Kabushiki Kaisha, Tokyo, Japan

[22] Filed: Nov. 30, 1970

[21] Appl. No.: 93,643

[30] Foreign Application Priority Data

Dec. 10, 1969    Japan..................44/116773

[52] U.S. Cl. .................................................180/33 R
[51] Int. Cl. ............................................B62d 3/00
[58] Field of Search..........180/30, 33 R, 33 A, 54 A; 123/198 E

[56] References Cited

UNITED STATES PATENTS

| | | | |
|---|---|---|---|
| 2,111,691 | 3/1938 | Salsbury | 180/33 R |
| 2,875,840 | 3/1959 | Klemm | 180/54 A |
| 1,863,015 | 6/1932 | Kamrath | 180/54 A |

*Primary Examiner*—Gerald M. Forlenza
*Assistant Examiner*—John Mannix
*Attorney*—Waters, Roditi, Schwartz & Nissen

[57] ABSTRACT

An air inlet opening of the hose of an air cleaner in a motorcycle faces upwardly and is fixedly located below the front portion of a carrier. The carrier is made larger in width than the vehicle frame, and a housing is attached in offset manner to the lower surface of the carrier and is provided with an opening in its rear surface position just above the vehicle frame, the air hose being attached to the bottom of the housing on one side of the frame.

6 Claims, 3 Drawing Figures

PATENTED OCT 17 1972  3,698,503
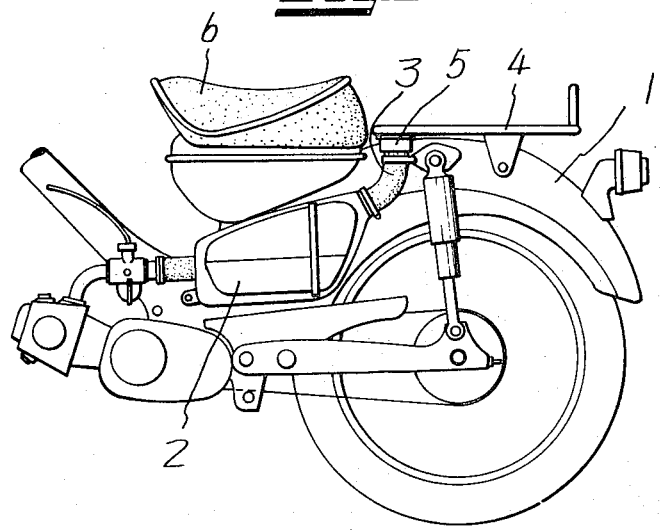
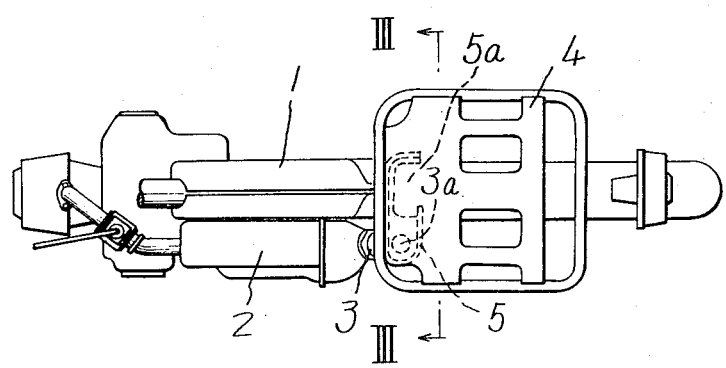
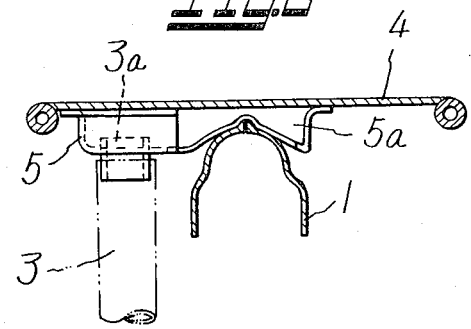
INVENTOR
Mikihiro Koyama

SUPPORT OF AN AIR HOSE OF AN AIR CLEANER OF A MOTORCYCLE AT ITS INLET OPENING

BRIEF SUMMARY OF THE INVENTION

This invention relates to the mounting of an air inlet opening of an air cleaner suitable for a motorcycle, and especially, a motorcycle which is intended to travel on rough ground and through water of some depth. The depth of water in which this type of motorcycle can drive depends on the height above the ground of the air inlet opening of the air cleaner. Additionally, it is necessary to prevent splashes of mud, water and the like from entering the air inlet opening.

As a result of investigation of the manner of splashing of water when driving a motorcycle in water, it has been found that the region just behind the hips of the driver is not splashed with water because the driver serves as a barrier and that such region is the optimum position for the location of the air inlet opening.

Accordingly, the invention contemplates mounting a carrier on the rear frame of a motorcycle immediately behind the driver's seat and attaching the air hose of the air cleaner to said carrier such that the inlet of the hose is behind the driver's seat and faces upwardly and is shielded by the carrier against entry of water.

Advantageously, a housing is connected to the lower surface of the carrier and encloses the air inlet, the housing having a rearwardly facing opening for entry of air. The housing opening is located directly above the frame and the air hose extends on one side of the frame and enters the housing at a laterally offset position from the housing opening. This not only facilitates attachment of the hose to the housing but also aids in preventing direct entry of water into the inlet opening via the housing opening.

BRIEF DESCRIPTION OF THE DRAWING

FIG. 1 is a side elevation view of the rear portion of a motorcycle;

FIG. 2 is a top plan view thereof; and

FIG. 3 is an enlarged sectional view taken along the line III—III in FIG. 2.

DETAILED DESCRIPTION

Referring to the drawing, therein is seen a frame 1 of the motorcycle with an air cleaner 2 for an engine attached to the side of the frame in sealed relation to prevent entry of dust or water. An inlet hose or pipe 3 for the air cleaner 2 extends upwards therefrom and a section with an air inlet opening 3a is fixedly secured adjacent the lower surface of the front portion of a carrier 4. The carrier 4 is secured to the frame 1 and has a greater width than the frame to extend laterally thereof as seen in FIG. 2. The carrier 4 is mounted on the frame behind the seat 6 for the driver.

The inlet opening 3a is so positioned that water, mud, or the like coming from in front during driving is mainly blocked by the driver from entering opening 3a whereas water from above is obstructed by the carrier 4, and thus prevented from entering inlet opening 3a. The carrier 4 will thus prevent entry of water into inlet 3a from rain or from wash water used to clean the vehicle. The position of the air inlet opening 3a is thus very effective.

For more complete prevention of water or mud entry into the air inlet, it is preferable to mount a housing 5 on the lower surface of the carrier 4 to enclose the opening 3a as shown in the drawing. The housing is provided with a rearwardly facing opening 5a which is laterally offset from the inlet opening 3a. In order for air to enter inlet 3a it must first pass through opening 5a in housing 5 and then travel laterally into inlet opening 3a. This indirect flow path serves to prevent entry of water directly into the inlet opening 3a.

In order to prevent any water which may have entered the housing 5 and remains therein from flowing into the air inlet opening 3a, the opening 3a is spaced above the bottom surface of housing 5 as best seen in FIG. 3.

As previously noted, the carrier 4 is larger in width than the vehicle frame 1, and thus the housing 5 can be attached to the lower surface of the carrier 4 so as to extend from the center of the carrier to one side whereby the opening 5a can be positioned immediately above the vehicle frame 1, while the opening 3a is attached to the housing 5 on one side of the frame 1. With this arrangement, the entry of water can be almost completely prevented and the attachment of the hose at the inlet opening 3a can be facilitated.

It is seen from the above that the carrier 4 serves as a means to support the hose 3 so that the inlet opening 3a is facing upwardly immediately behind the seat 6 while also shielding the opening 3a so as to prevent water entry into hose 3.

What is claimed is:

1. In a motorcycle having a frame with an engine and an air cleaner mounted thereon, and a seat for a driver above the engine, the improvement comprising an air hose connected to the air cleaner and having an upwardly facing inlet for entry of air, means on said frame supporting said hose so that the inlet thereof is immediately behind the seat for the driver, said means facing and covering said inlet from above to shield the same against entry of water and comprising a carrier secured to said frame, and a housing attached to said carrier and depending therefrom, said housing enclosing the inlet of said air hose and having a rearwardly facing opening for admission of air into said housing.

2. The improvement as claimed in claim 1 wherein the opening in the housing is laterally offset from the inlet of said air hose.

3. The improvement as claimed in claim 1 wherein said carrier has a greater width than said frame.

4. The improvement as claimed in claim 3 wherein said opening in the housing is above said frame and aligned therewith.

5. The improvement as claimed in claim 4 wherein said hose extends adjacent said frame and said inlet is on one side of the frame.

6. The improvement as claimed in claim 4 wherein said housing has a bottom surface and said air inlet of said hose is spaced above said bottom surface of the housing.

* * * * *